(12) United States Patent  
Nakanishi et al.

(10) Patent No.: US 9,114,742 B2  
(45) Date of Patent: Aug. 25, 2015

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Masashi Nakanishi, Aichi-ken (JP); Masatoshi Toyama, Aichi-ken (JP); Toshio Murakami, Aichi-ken (JP); Yuji Matsumoto, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/060,880

(22) Filed: Oct. 23, 2013

(65) Prior Publication Data

US 2014/0117728 A1  May 1, 2014

(30) Foreign Application Priority Data

Oct. 25, 2012 (JP) .................................. 2012-235599

(51) Int. Cl.
*B60N 2/015* (2006.01)
*B60N 2/427* (2006.01)

(52) U.S. Cl.
CPC ............ *B60N 2/42709* (2013.01); *B60N 2/015* (2013.01)

(58) Field of Classification Search
CPC ...... B60N 2/005; B60N 2/015; B60N 2/4214; B60N 2/42709; B60N 2/4235; B60N 2/42736; B60N 2/0732

USPC ......... 296/30, 63, 65.02, 65.03, 68.1, 187.08, 296/193.07
See application file for complete search history.

(56) References Cited

U.S. PATENT DOCUMENTS

| 6,176,543 | B1 * | 1/2001 | Nawata et al. ............... 296/68.1 |
| 6,685,272 | B1 * | 2/2004 | Bonk et al. ................. 297/463.1 |
| 7,717,509 | B2 * | 5/2010 | Kojima ....................... 297/216.2 |
| 8,047,605 | B2 * | 11/2011 | Yamazaki et al. ......... 297/216.1 |
| 2011/0241381 | A1 * | 10/2011 | Sato et al. ................ 296/193.02 |

FOREIGN PATENT DOCUMENTS

JP          7-266954          10/1995

* cited by examiner

*Primary Examiner* — Jason S Morrow  
*Assistant Examiner* — E Turner Hicks  
(74) *Attorney, Agent, or Firm* — Greenblum & Bernstein, P.L.C.

(57) ABSTRACT

A vehicle seat including: a seat structure member including a seat back and a seat cushion; and a support member configured to support the seat structure member and fastened to a vehicle compartment structural body, wherein the support member is a flat plate member which elongates in a longitudinal direction and has a convex bead portion extending in the longitudinal direction of the support member, wherein the bead portion includes a first bead portion and a second bead portion, and a stress concentrating portion of the support member, to which stress is configured to concentrate when vehicle collision occurs, is interposed between the first bead portion and the second bead portion, and wherein the stress concentrating portion of the support member includes a weakened portion configured to promote breakage of the support member.

17 Claims, 4 Drawing Sheets

VEHICLE SEAT

CROSS-REFERENCE TO RELATED APPLICATIONS

This application claims priority from Japanese Patent Application No. 2012-235599 filed on Oct. 25, 2012, the entire contents of which are incorporated herein by reference.

TECHNICAL FIELD

Aspects of the present invention relate to a vehicle seat including a support member, which is fastened to a floor surface of a vehicle compartment or the like while supporting a seat structure member, and a bead portion (a convex portion for reinforcing the support member).

BACKGROUND

A vehicle seat including a support member, which is fastened to a floor surface of a vehicle compartment or the like while supporting a seat structure member, and a bead portion, is disclosed in JP-A-H07-266954. The vehicle seat includes a seat cushion and a seat back (seat structure member), a leg member, and a rail member.

The leg member (an example of the support member) is a flat plate member extending in a longitudinal direction of the seat, and is reinforced by a convex portion (bead portion) extending linearly in a longitudinal direction of the leg member. Front and rear end portions of the leg member are bent in a crank shape toward the floor surface (one example of a vehicle compartment structural body) of the vehicle compartment, and are provided with holes through which fastening members can be inserted. Further, the rail member includes an upper rail attached to a seat structure member side and a lower rail attached to the leg member side, and both rails are connected to each other in a relatively movable manner.

In the known art, the leg member is connected to the seat structure member (lateral portion) via the rail member. As the front and rear end portions of the leg member are fastened to the floor surface of the vehicle compartment, the seat structure member can be installed on the floor surface of the vehicle compartment.

SUMMARY

However, in the above-described seat configuration, when vehicle collision occurs, due to the seat back being tilted rearward by a load of a passenger, a moment (bending force) may act on the leg member.

Since the leg member of the related art is reinforced by the bead portion and thus hardly deforms, a large load may be applied to the fastening portions (floor surface side of the vehicle compartment) of the leg member. If a large load is applied to the fastening portions, the leg member may be caused to fall out from the floor surface of the vehicle compartment, and there is fear that the floor surface of the vehicle compartment is broken over a wide range.

By making the entire leg member to be weak, it is possible to absorb the impact applied by the vehicle collision by breakage of the leg member. However, in this case, it may not be possible to perform the original function of the leg member (function of supporting the seat structure member).

Accordingly, an object of the present invention is to install a support member with high strength, while preventing a vehicle compartment structural body from being broken as much as possible when vehicle collision occurs.

According to an aspect of the present invention, there is provided a vehicle seat including: a seat structure member including a seat back and a seat cushion; and a support member configured to support the seat structure member and fastened to a vehicle compartment structural body, wherein the support member is a flat plate member which elongates in a longitudinal direction, which is a direction along at least one side of the seat cushion, and has a convex bead portion extending in the longitudinal direction of the support member, wherein the bead portion includes a first bead portion and a second bead portion, and a stress concentrating portion of the support member, to which stress is configured to concentrate when vehicle collision occurs, is interposed between the first bead portion and the second bead portion, and wherein the stress concentrating portion of the support member includes a weakened portion configured to promote breakage of the support member.

Accordingly, the strength of the support member can be maintained as much as possible by the first bead portion and the second bead portion. In addition, when vehicle collision occurs, since the breakage of the support member can be promoted by the weakened portion, it is possible to prevent the vehicle compartment structural body from being damaged as much as possible.

In the above-described vehicle seat, the weakened portion may include a pair of protrusion portions from which the support member is configured to bend.

Accordingly, since the bending (breakage) of the support member can be promoted by the pair of protrusion portions, it is possible to reliably prevent the vehicle compartment structural body from being damaged.

DETAILED DESCRIPTION

Figure 1:
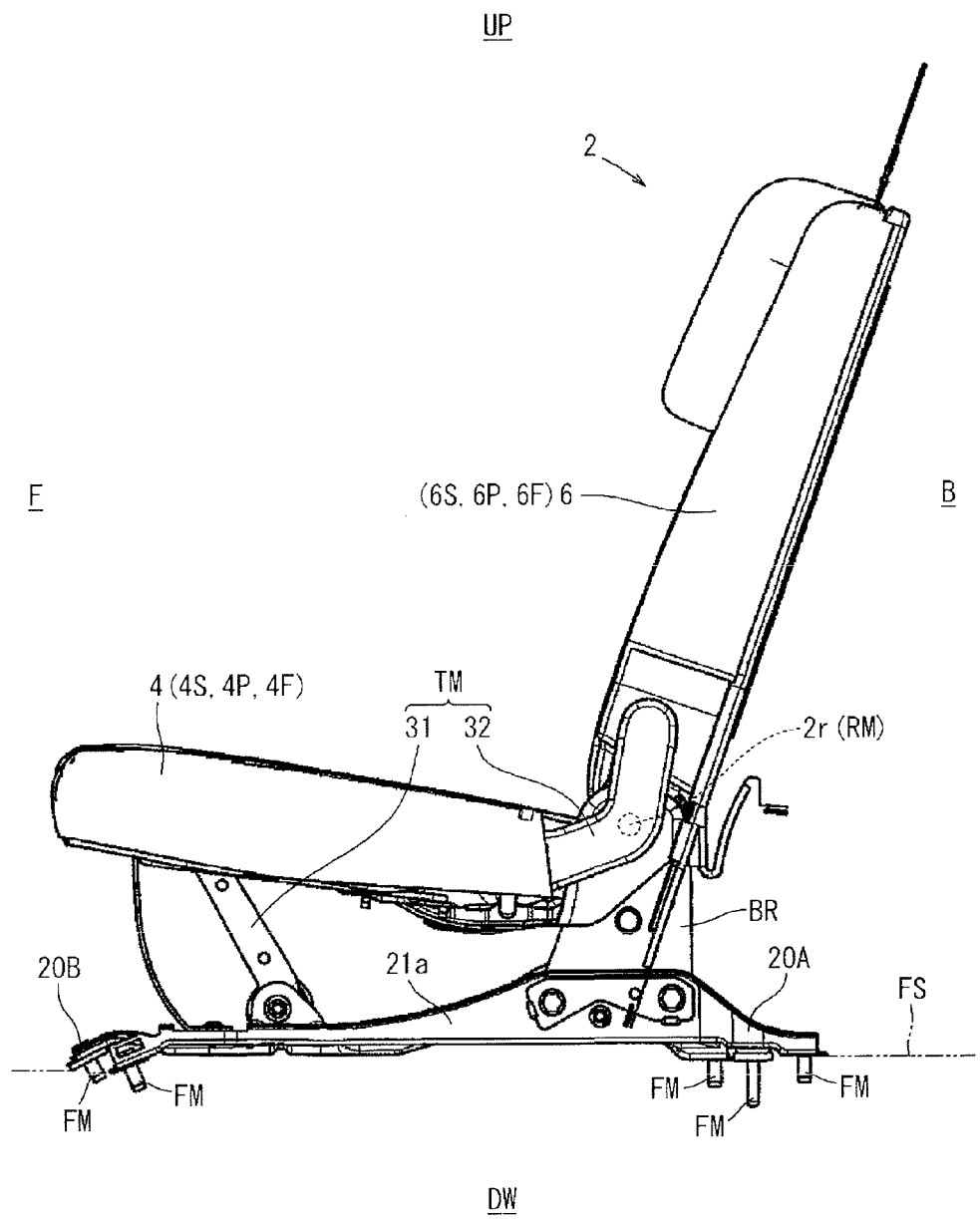
FIG. 1 is a side view of a vehicle seat.

An embodiment for implementing the present invention will now be described with reference to FIGS. 1 to 4. In this instance, a front side of a vehicle seat is indicated by a reference numeral F, a rear side of the vehicle seat is indicated by a reference numeral B, an upper side of the vehicle seat is indicated by a reference numeral UP, and a lower side of the vehicle seat is indicated by a reference numeral DW.

A vehicle seat 2 in FIG. 1 includes a seat cushion 4 and a seat back 6 (seat structure member), and a pair of leg members 20A and 20B, which will be described in detail later. The seat structure members have frame members 4F and 6F forming a seat framework, cushion members 4P and 6P forming an appearance of the seat, and covering members 4S and 6S for covering the cushion members, respectively.

Figure 2:
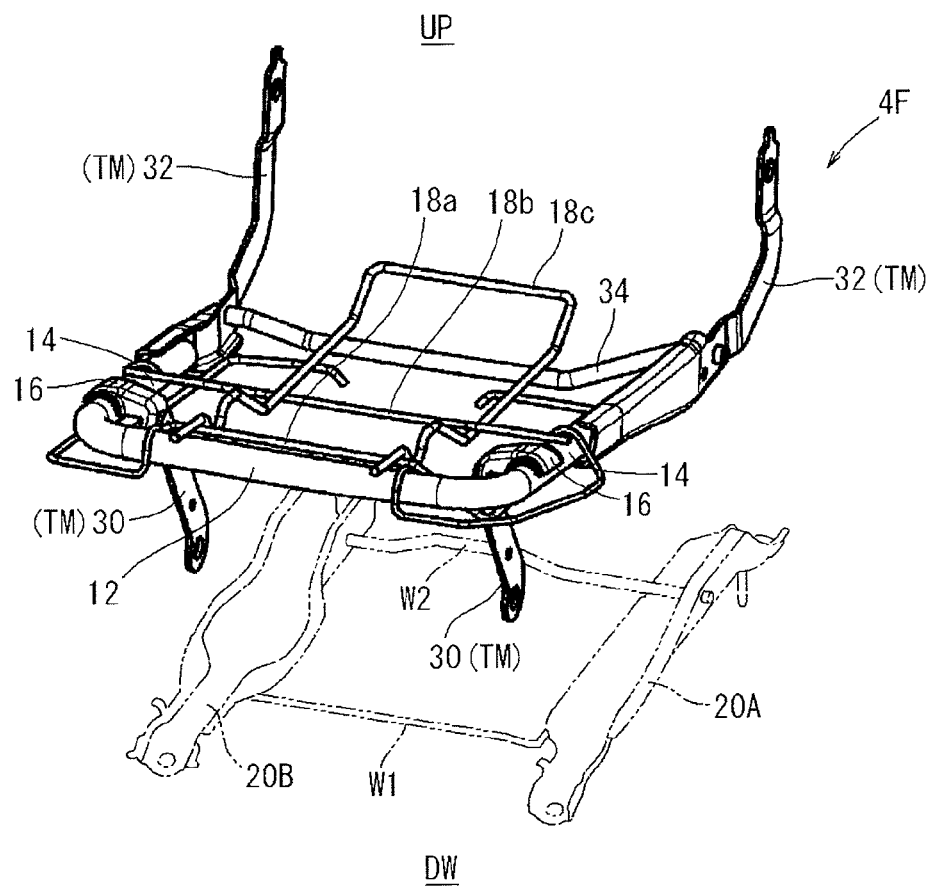
FIG. 2 is a perspective view of a frame member.
Figure 3:
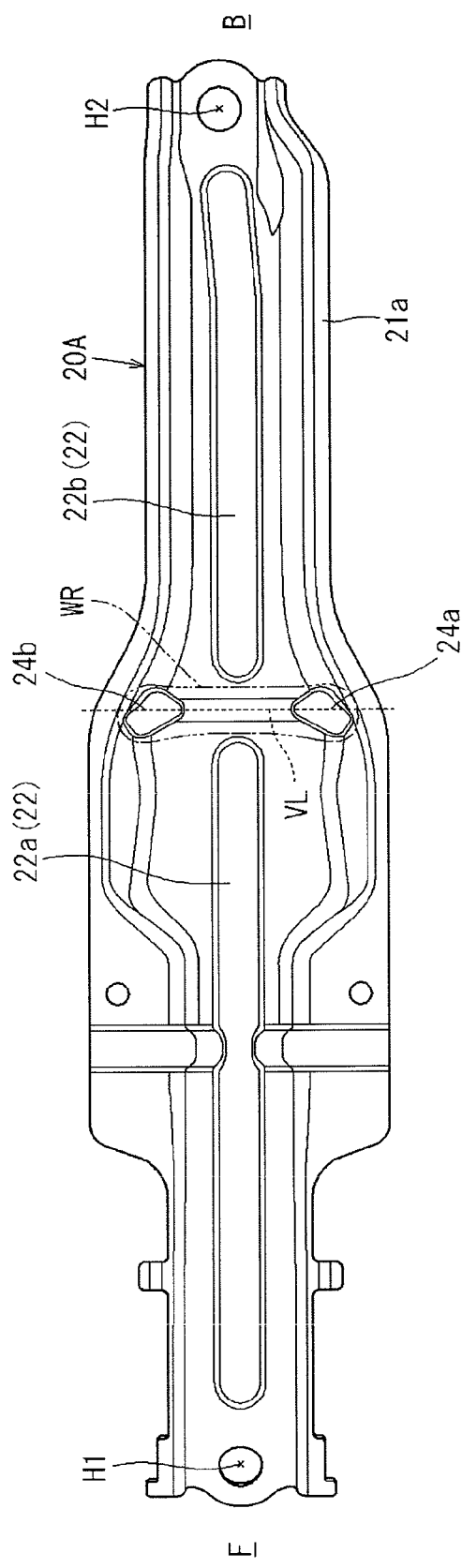
FIG. 3 is a plan view of a leg member.

In this embodiment, a pair of leg members 20A and 20B are fastened to a floor surface FS of a vehicle compartment, respectively, while supporting both sides of the seat structure member (see FIGS. 1 to 3).

In this instance, the respective leg members 20A and 20B is reinforced by a bead portion 22, which will be described in detail later, to stably support the seat structure member. In the seat configuration of such a kind, there is fear that a large load will be applied to a fastening portion of the respective leg members 20A and 20B (the floor surface FS of the vehicle compartment) when vehicle collision occurs. For example, if a large load is applied to the fastening portion, the respective leg members 20A and 20B falls out from the floor surface FS of the vehicle compartment, so that the floor surface FS of the vehicle compartment is broken over a wide range.

Accordingly, in the embodiment, a configuration described later will be employed so as to install the respective leg members 20A and 20B with high strength, while preventing the damage of the floor surface FS of the vehicle compartment when vehicle collision occurs as much as possible. Each configuration will be described in detail hereinafter.

Seat Structure Member

The seat structure member includes the seat cushion 4, the seat back 6, and various mechanisms (a reclining mechanism RM and a tilt-down mechanism TM) (see FIGS. 1 and 2).

The seat cushion 4 is a substantially rectangular-shaped member when seen from an upward direction, and includes the above-described basic configuration (4F, 4P and 4S).

The frame member 4F can be made of a material having typically excellent strength, such as metal and resin (see FIG. 2). The frame member 4F of the embodiment is a substantially rectangular frame-like member. The frame member 4F includes a front frame 12, a pair of lateral frames 14, attaching portions 16, and a plurality of support wires (18a to 18c).

The front frame 12 is a member (pipe shape) forming a front portion of the seat cushion. Further, the pair of lateral frames 14 are members (pipe shape) each forming a lateral portion of the seat cushion, and are disposed to face each other at the lateral portions of the seat.

The attaching portions 16 are flat plate members (substantially L-shaped cross section) each attached to each lateral frame 14 (front portion), and the tilt-down mechanism TM (front link 30), which will be described later, can be attached thereto. The plurality of support wires (18a to 18c) are linear members capable of supporting the respective cushion members 4P, and can be appropriately installed in every direction on the frame member 4F.

Various Mechanisms

The reclining mechanism RM is a mechanism capable of maintaining a raising/laying state of the seat back 6 to the seat cushion 4, and has a shaft portion 2r extending in a seat width direction (see FIG. 1).

In this embodiment, the seat back 6 is displaced by the rotating operation around the shaft portion 2r among an upright posture in which the seat back stands up against the seat cushion 4, a rearward tilting posture in which the seat back is inclined toward a rear side of the seat, and a forward tilting posture in which the seat back is inclined toward a front side of the seat.

The tilt-down mechanism TM is a mechanism capable of moving (approaching or separating) the seat structure member with respect to the floor surface FS of the vehicle compartment (see FIGS. 1 and 2). The tilt-down mechanism TM of this embodiment can include a pair of front links 30 and a pair of rear links 32 (four-node link configuration).

The pair of front links 30 is flat plate members of a straight shape, and may be disposed at both sides of the vehicle seat 2. In this embodiment, one side of the one front link 30 is rotatably attached to the lateral frame 14 (the first attaching portion 16), and the other side is rotatably attached to the one leg member 20A which will be described in detail later. The other front link 30 is similarly attached to the lateral frame 14 and the other leg member 20B which will be described in detail later.

The pair of rear links 32 (boomerang link) are faced links of the front links 30, and are attached to the rear portions of the lateral frames 14 and extended to the rear portion of the seat (FIG. 1 shows a state in which the rear link is covered by a cover material). In this embodiment, the rear portion of the respective rear links 32 is attached to the respective leg members 20A and 20B by a fixing bracket BR so as to be tiltable (rotatable), and a reinforcing pipe 34 is bridged between the pair of rear links 32.

In this embodiment, when the seat back 6 is tilted forward, the front link 30 and the rear link 32 are tilted forward, and thus the seat structure members are disposed adjacent to the floor surface FS of the vehicle compartment (becomes a tilt-down state). Further, when the seat back 6 stands up, the front link 30 and the rear link 32 stand up, and thus the seat structure members are spaced apart from the floor surface FS of the vehicle compartment (becomes a basic state).

Leg Member (One Example of Support Member)

The pair of leg members (the first leg member 20A and the second leg member 20B) are flat plate members each extending in a front-rear direction of the seat, and can be disposed along the lateral portions of the seat cushion 4 (see FIGS. 1 to 4).

In this embodiment, the first leg member 20A and the second leg member 20B are disposed parallel to each other in the seat width direction, and are connected to each other by a plurality of wires W1 and W2 (rod members extending in the seat width direction). Both leg members 20A and 20B support the seat structure members (both sides) and are fastened to the floor surface FS of the vehicle compartment, respectively.

In this embodiment, the first leg member 20A and the second leg member 20B have the substantially same basic configuration. For this reason, the configuration of the first leg member 20A will be described as one example, and the configuration of the second leg member 20B will not be described in detail herein.

The first leg member 20A has a connection portion 21a, a pair of fastening holes H1 and H2, and a configuration (stress concentrating portion WR, a bead portion 22, and a pair of protrusion portions 24a and 24b) which will be described later (see FIGS. 3 and 4).

The connection portion 21a is a portion protruding from the middle of the first leg member 20A, and is formed by bending a lateral edge of the first leg member 20A upwardly. In this embodiment, the wire member W2 and the bracket BR can be appropriately attached to the connection portion 21a.

Further, the pair of fastening holes (the first fastening hole H1 and the second fastening hole H2) are holes (through-holes) each formed in the first leg member 20A, and a rod-shaped fastening member FM can be inserted therein (see FIG. 1). The first fastening hole H1 is provided in a front end portion of the first leg member 20A, and the second fastening hole H2 is provided in a rear end portion of the first leg member 20A. A plurality of fastening members FM can be attached to the second leg portion 20B (rear end portion). In this embodiment, the front and rear end portions of the first leg member 20A can be fastened to the floor surface FS of the vehicle compartment by the fastening members FM inserted into the fastening holes H1 and H2.

Stress Concentrating Portion

In the above-described configuration, when vehicle rear collision occurs, due to the seat back 6 being tilted rearward by a load of an occupant, the moment (bending force) acts on the respective leg members 20A and 20B (see FIG. 1).

If the installation position of the vehicle seat 2 is relatively high in the vehicle compartment, the first leg member 20A or the like has a tendency to bend toward the upper side of the seat. A portion where the stress concentrates (stress concentrating portion WR) is formed at the middle, in the longitudinal direction, of the first leg member 20A or the like (see FIG. 3).

The position of the stress concentrating portion WR can be identified (actually measured) by a test using each leg member (without bead portion), and can also be identified by simulation using a computer. In this instance, the position of the stress concentrating portion WR can be identified by supposing any one of a vehicle front collision, a vehicle rear collision, and a vehicle lateral collision.

Bead Portion

The bead portion 22 is a convex portion extending in the front-rear direction of the seat, and is divided into a first bead portion 22a and a second bead portion 22b with the stress concentrating portion WR being interposed therebetween (see FIG. 3).

The first bead portion 22a is a linear convex portion formed to the first leg member 20A (center of a front portion), and is formed toward the middle of the first leg member 20A (just before the stress concentrating portion WR) from the first fastening hole H1. Also, the second bead portion 22b is a linear convex portion formed to the first leg member 20A (center of a rear portion), and is formed toward the second fastening hole H2 from the middle of the first leg member 20A (just after the stress concentrating portion WR).

In this embodiment, the respective bead portions 22a and 22b can be formed by bending the center of the first leg member 20A upwardly in a convex shape. As the first leg member 20A is provided with the bead portion 22 in this way, the first leg member 22 can have enough strength to support the seat structure members.

Pair of Protrusion Portions (Weakened Portion)

Figure 4:
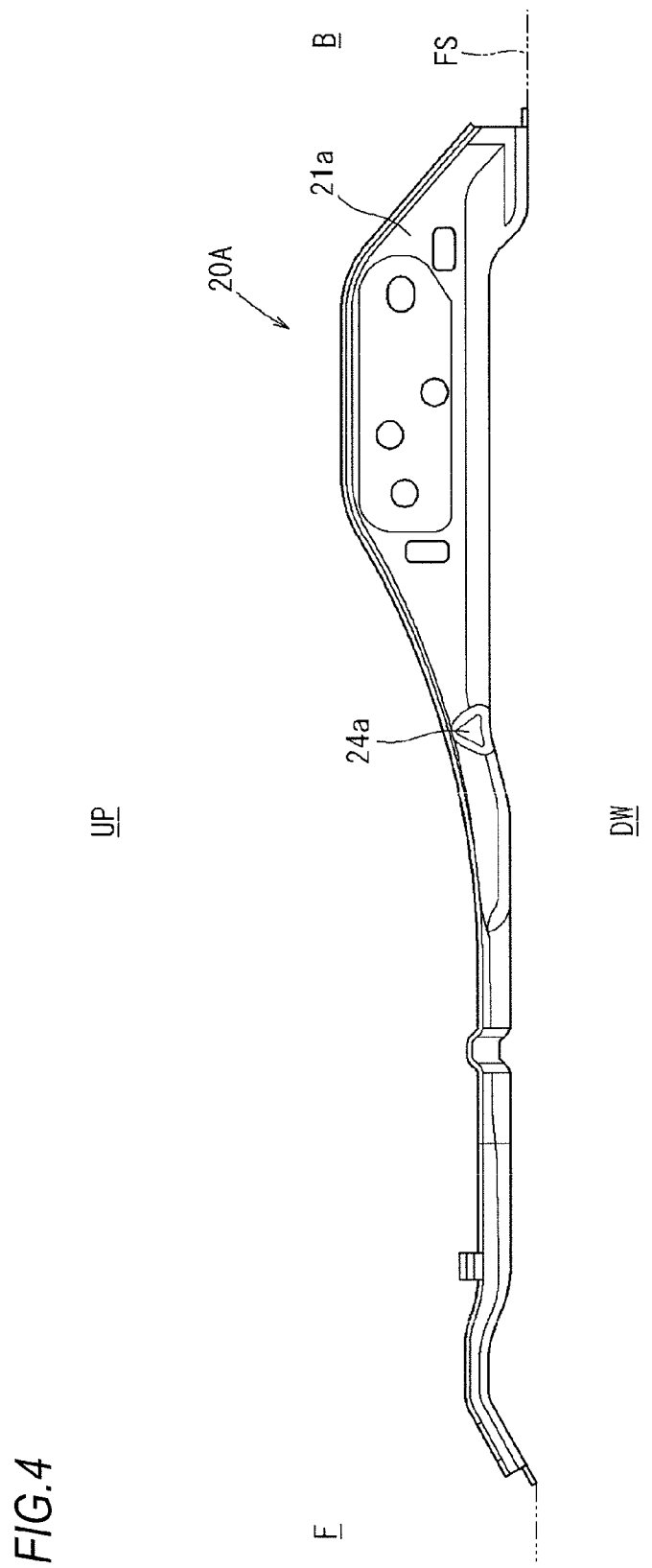
FIG. 4 is a side view of the leg member.

The pair of protrusion portions (the first protrusion portion 24a and the second protrusion portion 24b) are portions form which the first leg member 20A can bend, and can be formed to the stress concentrating portion WR (see FIGS. 3 and 4).

The first protrusion portion 24a is a portion (dot shape) protruding from one side of the stress concentrating portion WR. Further, the second protrusion portion 24b is a portion (dot shape) protruding from the other side of the stress concentrating portion WR, and is disposed parallel to the first protrusion portion 24a in the seat width direction (both protrusion portions are disposed on a virtual line VL crossing the leg member).

In this embodiment, the first protrusion portion 24a is formed by bending one portion of the first leg member 20A upwardly or inwardly in a convex shape. Also, the second protrusion portion 24b is formed by bending the other portion of the first leg member 20A upwardly or inwardly in a convex shape.

Behavior of Leg Member when Vehicle Rear Collision Occurs

With reference to FIGS. 1 to 4, due to the seat back 6 being tilted rearward when vehicle rear collision occurs, the respective leg members 20A and 20B tends to bend toward the upper side of the seat from the stress concentrating portion WR.

In this embodiment, since the respective protrusion portions 24a and 24b promotes the bending of the respective leg members 20A and 20B, the respective leg members 20A and 20B can be more reliably bent. Since the impact generated when the vehicle rear collision occurs is absorbed by the bending (breakage) of the respective leg members 20A and 20B, it is possible to prevent the breakage of the floor surface FS of the vehicle compartment.

As described above, in the embodiment, it is possible to maintain the strength of the respective leg members 20A and 20B as much as possible by the first bead portion 22a and the second bead portion 22b.

When vehicle collision or the like occurs, since the breakage of the respective leg members 20A and 20B is promoted by the weakened portion, it is possible to prevent the floor surface FS of the vehicle compartment from being broken as much as possible. In particular, in this embodiment, since the bending (breakage) of the respective leg members 20A and 20B is promoted by the pair of protrusion portions 24a and 24b when the vehicle rear collision occurs, it is possible to reliably prevent the floor surface FS of the vehicle compartment from being broken.

For this reason, according to this embodiment, it is possible to install the respective leg members 20A and 20B with high strength while preventing the breakage of the floor surface FS of the vehicle compartment as much as possible.

The vehicle seat 2 of the embodiment is not limited to the above-described embodiment, and can employ various embodiments. (1) In the embodiment, supposing that the installing position of the vehicle seat is relatively low, a pair of protrusion portions may be configured to protrude downward from the seat. If the installing position of the vehicle seat is relatively low in the vehicle compartment, each leg member has a tendency to bend toward the lower side of the seat when vehicle rear collision occurs. For this reason, the bending of each leg member toward the lower side of the seat is promoted by the pair of protrusion portions (protruding toward the lower side of the seat). In this instance, each leg member has a tendency to bend toward the lower side of the seat also when the vehicle front collision occurs.

(2) Although the configuration of the bead portion 22 is illustrated in the embodiment, it is not intended to limit the configuration thereof. For example, the bead portion may be divided into three sections. Further, each bead portion may be formed in various shapes, as well as the linear shape. Each bead portion may be formed by bending a portion of the leg member, or the bead portion may be made of a material different from the leg member. (3) In addition, although the pair of protrusion portions 24a and 24b have been described as one example of the weakened portion in this embodiment, it is not intended to limit the configuration thereof. For example, each leg member may be provided with a hole or a thin portion (all portions have low strength). Alternatively, the leg member may be provided with one or three or more protrusion portions.

(4) In addition, although the leg members are illustrated as one example of the support member in this embodiment, it is not intended to limit the configuration thereof. For example, the lower rail of the rail member can be used as the support member. In this instance, the configuration (shape, size, and installing position) of the leg member can be appropriately changed according to the configuration of the seat. For example, the support member may be fastened to various vehicle compartment structural bodies, such as a wall body of the vehicle compartment, as well as the floor surface of the vehicle compartment. Further, the leg member can be disposed along one side (lateral portion, front portion or rear portion) of the seat cushion. (5) Although the configuration of the vehicle seat 2 is illustrated in this embodiment, it is not intended to limit the configuration thereof. For example, various mechanisms can be removed from the vehicle seat 2.

What is claimed is:

1. A vehicle seat comprising:
   a seat structure member including a seat back and a seat cushion; and
   a support member configured to support the seat structure member and fastened to a vehicle compartment structural body,
   wherein the support member is a flat plate member which elongates in a longitudinal direction, which is a direction along at least one side of the seat cushion, and has a convex bead portion extending in the longitudinal direction of the support member,
   wherein the bead portion includes a first bead portion and a second bead portion, and a stress concentrating portion of the support member, to which stress concentrates when a vehicle collision occurs, is interposed between the first bead portion and the second bead portion,
   wherein the stress concentrating portion of the support member includes a weakened portion configured to promote breakage of the support member, and
   wherein when the vehicle collision occurs, the support member is bent upward from the stress concentrating portion.

2. The vehicle seat according to claim 1,
   wherein the weakened portion includes a pair of protrusion portions from which the support member is configured to bend.

3. The vehicle seat according to claim 1,
   wherein the vehicle compartment structural body includes a floor surface of the vehicle compartment.

4. The vehicle seat according to claim 1,
   wherein the stress concentrating portion is interposed between the first bead portion and the second bead portion such that the first bead portion is spaced from the second bead portion.

5. The vehicle seat according to claim 2,
   wherein each protrusion portion of the pair of protrusion portions is spaced from one another in a seat width direction.

6. The vehicle seat according to claim 2,
   wherein each protrusion portion of the pair of protrusion portions projects in an upward direction of the vehicle seat.

7. The vehicle seat according to claim 1,
   wherein the first bead portion and the second bead portion extend in substantially the same direction, and
   the first bead portion and the second bead portion have substantially the same width in a seat width direction.

8. A vehicle seat comprising:
   a seat structure member including a seat back and a seat cushion; and
   a support member configured to support the seat structure member and fastened to a vehicle compartment structural body,
   wherein the support member is a flat plate member which elongates in a longitudinal direction, which is a direction along at least one side of the seat cushion, and has a convex bead portion extending in the longitudinal direction of the support member,
   wherein the bead portion includes a first bead portion and a second bead portion, and a stress concentrating portion of the support member, to which stress concentrates when a vehicle collision occurs, is interposed between the first bead portion and the second bead portion,
   wherein the stress concentrating portion of the support member includes a weakened portion configured to promote breakage of the support member,
   wherein the weakened portion includes a pair of protrusion portions from which the support member is configured to bend, and
   wherein each protrusion portion of the pair of protrusion portions is spaced from one another in a seat width direction.

9. A vehicle seat comprising:
   a seat structure member including a seat back and a seat cushion; and
   a support member configured to support the seat structure member and fastened to a vehicle compartment structural body,
   wherein the support member is a flat plate member which elongates in a longitudinal direction, which is a direction along at least one side of the seat cushion, and has a convex bead portion extending in the longitudinal direction of the support member,
   wherein the bead portion includes a first bead portion and a second bead portion, and a stress concentrating portion of the support member, to which stress concentrates when a vehicle collision occurs, is interposed between the first bead portion and the second bead portion,
   wherein the stress concentrating portion of the support member includes a weakened portion configured to promote breakage of the support member,
   wherein the weakened portion includes a pair of protrusion portions from which the support member is configured to bend, and
   wherein each protrusion portion of the pair of protrusion portions projects in an upward direction of the vehicle seat.

10. The vehicle seat according to claim 8,
    wherein the vehicle compartment structural body includes a floor surface of the vehicle compartment.

11. The vehicle seat according to claim 8,
    wherein the stress concentrating portion is interposed between the first bead portion and the second bead portion such that the first bead portion is spaced from the second bead portion.

12. The vehicle seat according to claim 8, wherein each protrusion portion of the pair of protrusion portions projects in an upward direction of the vehicle seat.

13. The vehicle seat according to claim 8,
    wherein the first bead portion and the second bead portion extend in substantially the same direction, and
    the first bead portion and the second bead portion have substantially the same width in a seat width direction.

14. The vehicle seat according to claim 9,
    wherein the vehicle compartment structural body includes a floor surface of the vehicle compartment.

15. The vehicle seat according to claim 9,
    wherein the stress concentrating portion is interposed between the first bead portion and the second bead portion such that the first bead portion is spaced from the second bead portion.

16. The vehicle seat according to claim 9, wherein each protrusion portion of the pair of protrusion portions is spaced from one another in a seat width direction.

17. The vehicle seat according to claim 9,
    wherein the first bead portion and the second bead portion extend in substantially the same direction, and the first bead portion and the second bead portion have substantially the same width in a seat width direction.

\* \* \* \* \*